FLEXIBLE RESISTANCE ELEMENT FILM

Filed Nov. 23, 1966 2 Sheets-Sheet 1

Paul J. Hines
Inventor
by Alfred H. Rosen
Attorney

July 22, 1969 P. J. HINES 3,457,537

FLEXIBLE RESISTANCE ELEMENT FILM

Filed Nov. 23, 1966 2 Sheets-Sheet 2

Paul J. Hines
Inventor
by Alfred H. Rosen
Attorney

United States Patent Office 3,457,537

Patented July 22, 1969

3,457,537
FLEXIBLE RESISTANCE ELEMENT FILM

Paul J. Hines, 120 Radcliffe Road,
Weston, Mass. 02193

Filed Nov. 23, 1966, Ser. No. 596,617
Int. Cl. H01c 7/00
U.S. Cl. 338—162 17 Claims

ABSTRACT OF THE DISCLOSURE

This invention relates to electric resistance elements having superior electrical properties, in the form of an electrically conductive film of thermoset plastics material which may be totally unsupported. Starting with a suitable thermosetting resin having finely-divided conductor particles such as graphite or carbon, or graphite or carbon mixed with metal particles, dispersed in it, the film is formed by coating the resin on a support having a smooth surface from which the thermoset film will be strippable. The resin may be coated on the support by any suitable process, of which spraying, dip coating, brushing and vapor depositing are exemplary. The smooth surface may be provided by any suitable material, of which metals and certain stable plastics materials are exemplary. Any suitable thermosetting plastics material may be used to form the electrically conductive film (alkyds, allyls, caseins, epoxides, melamines, phenolics, polyesters, silicones, ureas and urethanes are exemplary) provided it can be formed into a film of a normally hard and rigid material. The film can be made thin enough to be flexible. Films in the range 0.2 mil to 3 mils thick have been found suitable for flexibility, but thicker films having the desired hardness, and dimensional and electrical stability can be used where flexibility is of lesser importance. Electrical resistance elements of practically any desired shape and function can be fabricated from films according to the invention by cutting, etching or stamping, for example, and can, if desired be mounted on any suitable support, as by an elastomeric or contact adhesive, which can be furnished with the film.

BACKGROUND OF THE INVENTION

The art of making electrically conductive rigid thermosetting plastics materials is well developed, as evidenced, for example, in U.S. Patents Nos. 3,003,975; 2,705,749; and 2,679,569. As applied to heating elements, exemplified by No. 2,679,569, the art fails to take into account the critical requirements of an electrical resistance element, suitable for example in a potentiometer. These requirements are:

(1) high electrical stability;
(2) low, predictable temperature coefficient of resistance;
(3) hard, durable, low coefficient of friction surface;
(4) high degree of function conformity tolerance (i.e.: linearity); and
(5) low output smoothness.

As applied to resistance elements, the art has heretofore been confined to the making of rigid resistor elements. This may well be due to the fact that the very same substances which are dispersed in a resin to provide electrical conductivity, namely carbon and metal particles, are known to render thermosetting plastics materials hard and brittle. The present invention opens an entirely new dimension in the art of making electrical resistors of electrically conductive themoset plastics materials by providing a resistor which can be made flexible, and which has all of the foregoing desired properties suitable for use in a potentiometer at least as good as, and with some properties superior to, those heretofore available.

DESCRIPTION OF THE INVENTION

It is an object of the invention to provide electrical resistance elements made of thermoset plastics materials which can be made available in a flexible form, and methods for making such elements.

Another object is to provide such resistance elements which are readily applicable to uses in precision potentiometers and trimmers.

Other objects are to provide such resistance elements which have high electrical and dimensional stability; low, predictable temperature coefficient of resistance; a high degree of function conformity tolerance; and a low value output smoothness.

These and other objects and features of the invention will become apparent from the following detailed description, which refers to the accompanying drawings, in which.

Figure 1:
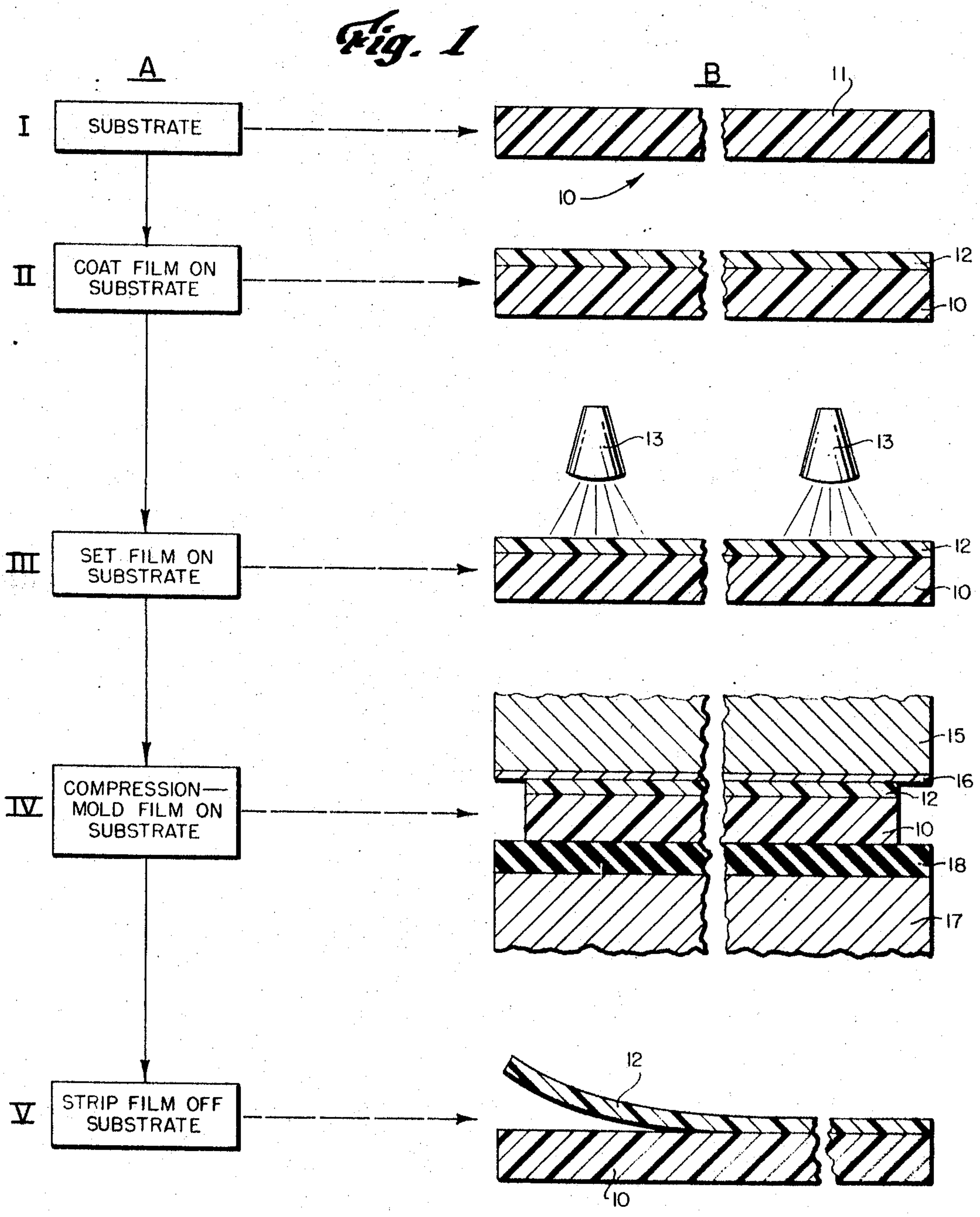
FIG. 1 is a process diagram illustrating a process for making resistance elements according to the invention.

A process for making a resistance element according to the invention will now be described with reference to FIG. 1.

A suitable substrate 10 is provided in Step I; it may be made of a metal or a thermoplastic plastics material. Stainless steel is a suitable metal. A sheet of a polyethylene terephthalate resin (e.g., as sold under the trademark "Mylar") or a tetrafluorethylene resin (e.g., as sold under the trademark "Teflon") is a suitable themoplastic material; each of these is characterized by chemical inertness and high temperature stability; each also provides a surface from which the film of thermoset plastics material about to be described is strippable, the former because it has a tough, hard surface, and the latter being notoriously non-sticking in its normal state. In any case, the surface 11 on which the thermoset plastics film is formed is made smooth, to facilitate the stripping process.

If desired, a permanent substrate 10 may be employed in Step I. In such case, a sheet of a polyethylene terephthalate resin (e.g., as sold under the trademark "Mylar") or a polyimide resin (e.g., as sold under the trademark "Kapton") is a suitable thermoplastic material; each of these is characterized by chemical inertness and high temperature stability (e.g., in the range from about (−)100° F. to (+)500° F.); each also can provide a tough, hard surface to which the film of thermoset plastics material about to be described will adhere; preferably if the surface is first roughened, as by sand-blasting. Preferably, the surface 11 on which the thermoset plastics film is formed is first made rough, to assure that the resistance element film will stick to it. For proper flexibility of the finished product, the substrate 10 is a sheet preferably between about 5 mils and 15 mils thick.

In Step II, the thermosetting resin is coated in a film 12 on the substrate 10, which is here shown enlarged. Since a wide variety of coating methods are well-known, no particular method is illustrated for this step. Reference may be made, for example to "A Concise Guide to Plastics" by Simonds and Church, Reinhold Publishing Corporation 1963, pages 159–165, for descriptions of several methods. The simple method of spread coating shown in Fig. 7.2 on page 164 may be used as illustrative of Step II, it being understood that other methods such as casting, roller coating, spray coating, curtain-flow coating, brush coating and dipping may be used. In Step II the ultimate thickness of the film 12 is roughly established. This is done, for example, by the coating knife in Fig. 7.2, or the metering roll in Fig. 7.3, of Simonds and Church.

In Step III the film 12 is set to the "B-stage" by means of heat, which may be supplied by one or more infra-red lamps 13. In this stage the film is a polymer which is thermoplastic in nature and therefore moldable. An electrically heated drying oven (not shown) may be used, in place of the lamp or lamps 13. In any case, after 10 to 15 minutes treatment at about 90° C., the solvent in the resin mix is evaporated, and the resin is "cured" or "set" to the "B-stage."

Step IV as illustrated is carried out in a compression molding press. This press comprises an electrically heated platen 17 having on its surface a silicone rubber face 18 of a high Durometer hardness number (for example 30–40). The substrate 10 bearing the film 12 is supported on this platen 17. The silicone rubber face 18 represents any suitable resilient material capable of withstanding high temperatures, of the order of 325° F. A second electrically heated platen 15, having on one of its faces a highly polished plate 16, bears on the film 12. The pressure is adjusted so that the film 12 is subjected in the "B-stage" to a pressure of about 1,500 lbs. per sq. in. for about 10 minutes, during and after which the film is allowed to thermoset. In this step, the thickness of the film 12, is determined, the preferred range of thickness for a flexible film being between about 0.2 mil. and 3 mils. The temperature of the platens 15 and 17 is maintained in the range about 300 to 400° F. The pressure may be varied between about 1500 and 6000 p.s.i., and the molding time may be as high as 15 minutes.

In Step V the film 12 is stripped off the substrate 10. This is, per se, a step that is known in the art, as mentioned, for example, by Simonds and Church at page 162 in the paragraphs under "Casting." The compression molding step of the process of the invention does not interfere with the strippability of the film 12 from a smooth surface of a metal substrate or a thermoplastic substrate of one of the kinds mentioned above. The final product is a film 12 of a normally hard and rigid thermoset plastics material, which may be highly flexible, and which is shown flexed in FIG. 2.

Step V may, if desired, be omitted particularly when there is employed as a substrate 10 a material to which film 12 will permanently adhere. In such a case, the final product is the combination of a film 12 of a normally hard and rigid thermoset plastics material, on a flexible thermoplastic substrate 10, which is shown flexed in FIG. 2. The "top" side 24 of the film 12 may be the smooth or, if desired, the lustrous surface, while the "bottom" side 25 of the supporting substrate 10 may be smooth or comparatively rough, as desired.

The film resistor of the invention has the desirable electrical and physical properties at least as good as those heretofore available in rigid molded plastic resistors, in addition to the novel property of flexibility which is now afforded and the advantages that flow from it. The resin used to form the film may be compounded in the same manner as resins used to form rigid thermoset molded plastics resistors. Examples are set forth later in this description. The resin mix does not lose its uniformity during the steps of the inventive process. Thus, for example, the function conformity tolerance, or linearity, when measured as specified in Specification MIL–R–39023 (proposed as an industry standard to Defense Electronics Supply Command by Precision Potentiometer Manufacturers Association) sections 3.18 and 4.6.15, is not greater than 1%; while the output smoothness (MIL–R–39023, sections 3.19 and 4.6.16) is not greater than 2%. The temperature coefficient of resistance can be adjusted to have a magnitude in the range from substantially zero to 4000 parts-per-million per ° C. Flexibility of the film 12 is such that a polyester film one mil thick and having electrical resistance between approximately 30 and 100,000 ohms per square may be curved on a radius less than ⅜ inch without cracking or taking a permanent set and without measurable alteration in its electrical resistance. The film 12 can be made in any thickness which provides useful flexibility, the range from 0.2 mil to 3 mils being preferred for flexibility, although thicker films are also possible, and have been made, at the present time, up to 7 mils thick. Stable dimensional and electrical properties are found throughout this range of thickness.

An example of the process for making a resistor according to the invention is as follows:

The starting formulation consisted of the following components:

(1) 158.1 grams, phenolic resin, type BLS–3536, obtained from Union Carbide Plastics Division. This is a one-stage, 60% solids content resin in an alcohol solvent.

(2) 35.4 grams, conductive oil furnace black (carbon), obtained as Vulcan XC–72R from Godfrey L. Cabot, Inc., Boston, Mass.

(3) 500 ml. acetone (a solvent).

A mixture was made of these components, using a "Waring-type" blender. The phenolic resin was weighed and poured into the blender. To this was added about 50% of the acetone solvent. Gradually the remaining 50% of the acetone solvent was added along with the furnace black. These components were mixed for a period of 5 minutes.

This mixture was then sprayed on to sheets of polyethylene or tetrafluorethylene (Teflon). The coated sheets were placed in a well-ventilated oven at a temperature of 60° C. for a period of 16 hours. At the end of this period, the dried film was removed from the sheets by flexing the sheets. The pieces of dried film were placed in a one gallon size ceramic jar and ball milled to a powder form for a period of 20 minutes at 60 r.p.m. The grinding media consisted of 20 lbs. of ½" diameter stainless steel balls. This powder was then classified through a 200 mesh screen. The yield of this process was dissolved in enough acetone to make it suitable for spraying. This mixture was then applied to a non-adhesive substrate according to Step II in FIG. 1. Dipping, roller coating, flow coating and spraying have been used. The film 12 was formed, and then cured (Step III) in a circulating oven for a period of 10 minutes at 90° C. After this cure, the film was compression molded (Step IV) for 10 minutes at 1500 lbs./sq. in., with the platen temperature at 325° F. To insure that the pressure was uniformly applied to the film during the molding cycle, a silicone rubber mat 18, ½" thick, having a Durometer hardness of 30–40, was placed under the substrate 10. A smooth, highly polished plate 16, with a finish of at least 8 micro inches, was inserted between the top press platen 15 and the film. This combination yielded a film 12 which, when measured with an electronic indicating device, such as a Cleveland Instrument Co. Model A–215–R–OH, showed thickness variation over a 6" span to be no greater than ±3 ten thousandths of an inch (.0003). The film was then separated from the substrate according to Step V by carefully flexing the substrate film combination.

A film made in the manner described above, from the stated formulation, when molded .001" thick will measure about 200 ohms/sq. The resistivity can be adjusted by varying one or both of two parameters: the ratio of carbon-to-resin in the first two components, and the ball milling time. The chart below (Table I) gives six formulations, including approximately the one described above in detail, with variations of carbon content and grinding time, and shows the resistivity (film thickness 0.001") for various combinations of these two parameters.

TABLE I

| Carbon content, percent | Ω/sq., 20 mins. ball milling time | Ω/sq., 1 hour additional ball milling time |
|---|---|---|
| 25.0 | 2,000 | 40,000 |
| 27.5 | 200 | 8,000 |
| 32.5 | 140 | 1,600 |
| 37.0 | 80 | 400 |
| 43.5 | 56 | 80 |
| 55.0 | 36 | 48 |

Figure 6:
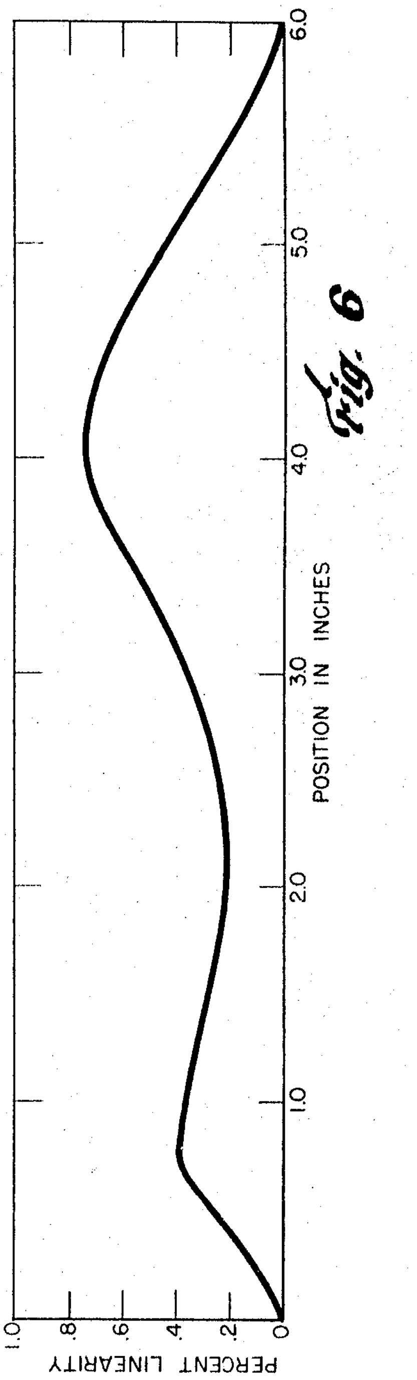
FIG. 6 is a graph illustrating typical superior linearity properties of resistors according to the invention.

Another parameter that has been varied to adjust the resistance is the film thickness. The thicker the film, the lower the resistivity. The thicker film is flexible but cannot be bent in as small a radius as the thinner film. FIG. 6 shows a typical curve of percent linearity versus position along a specimen resistor made according to the invention, from which it appears that linearity is not greater than 1%. This was formed to be true for the full range of variables exemplified in Table I.

Figures 2, 3:
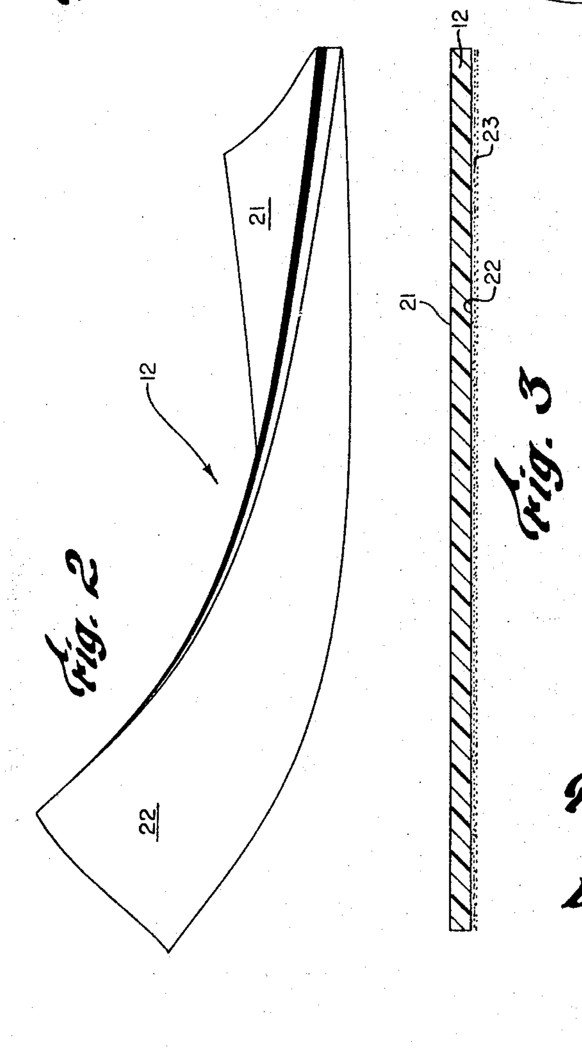
FIG. 2 illustrates a resistance element according to the invention.
FIG. 3 illustrates another resistance element according to the invention.

In FIG. 2, the "top" side 21 of the film may be the smooth or, if desired, the lustrous surface, while the "bottom" side 22 may be smooth or comparatively rough, as desired. As is indicated in FIG. 3, a pressure sensitive adhesive 23 (or if desired another form of adhesive) may be applied to the bottom side 22 of the film. Such adhesives are well-known; silicone adhesives, mentioned in Simonds and Church at page 64, are exemplary. The use of an adhesive makes it possible to apply a flexible resistor of normally rigid electrically-conductive thermoset plastics material, having a high degree of electrical and mechanical precision, suitable for use in a precision potentiometer, for example, to nearly any form of supporting surface.

Figures 4, 5:
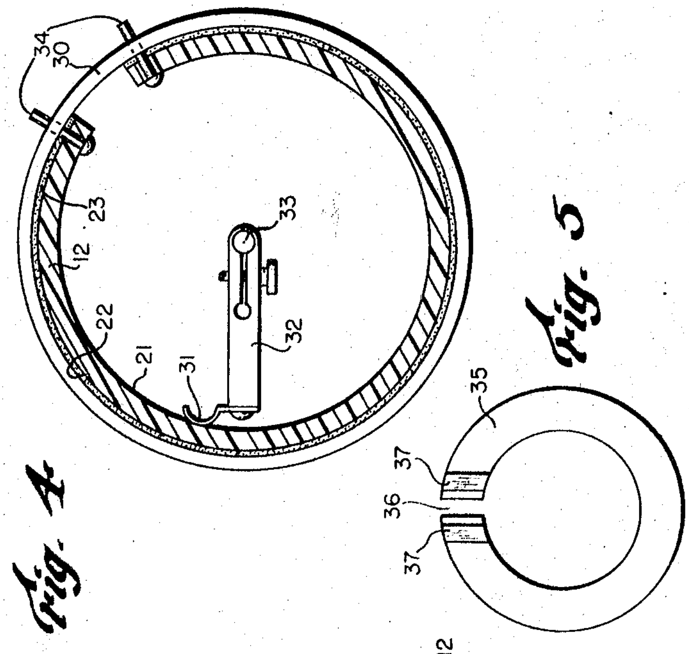
FIG. 4 illustrates the element of FG. 3 applied in a potentiometer.
FIG. 5 illustrates a flat piece of resistance element in annular form, as may be cut or stamped out of a larger piece as shown in FIG. 2 or FIG. 3, for use in a particular device.

FIG. 4 illustrates a resistor according to FIG. 3 adhered to the inner surface of a cylindrical support 30. The smooth surface 21 is inwardly-facing, for contact by the sliding contact 31 on an arm 32 rotatable about a center support 33. This is a simplified illustration of one form of a potentiometer. Electrical contacts are made to the ends of the film 12 by means of rivet-shaped conductors 34, 34 passing through the film and the support 30 to hold the ends of the film in place and at the same time serve as electrical terminals. Alternatively, electrically-conductive terminals may be painted on the surface 21 of the film, using for example any commercially-available silver solution, to which leads can be attached with an epoxy silver solder. A pressure sensitive adhesive not only holds the film 12 in place, but also provides a resilient cushion between the film and the support 30, useful to maintain uniformity of contact between the film surface 21 and the sliding contact 31.

For flat potentiometers, trimmers or the like, a piece of the film 12 may be stamped out in annular form 35 as shown in FIG. 5; a radial gap 36 is provided across the annulus, and the terminal ends of the resistor are located at each side of this gap. Electrically conductive terminals 37 are shown "painted" on the annulus at the terminal ends. If this annular piece is stamped out of a resistor element according to FIG. 3, it may then be applied to any flat surface to function as a potentiometer, as a trimmer, or as a sensor, for example, as desired.

The foregoing description of certain embodiments of the invention, but rather only to illustrate its principles and the best manner presently known to practice it. Therefore, such other forms of the invention as may occur to one skilled in this art on a reading of the foregoing specification are also within the spirit and scope of the invention, and it is intended that this invention include all modifications and equivalents which fall within the scope of the appended claims.

I claim:

1. An electrical resistance element capable of being affixed in an electrical resistor device, said element being flexible and self-supporting and comprising a film between about 0.2 and 3 mils thick of electrically conductive particles uniformly dispersed in a cured normally hard and rigid thermoset plastics material.

2. A self-supporting resistance element according to claim 1 having electrical resistance between approximately 30 and 100,000 ohms per square at a nominal thickness of one mil.

3. A self-supporting resistance element according to claim 1 including an adhesive material on a surface of said film.

4. A self-supporting resistance element according to claim 1 in which said film has a hard surface which is smooth and has a low coefficient of friction.

5. A resistance element according to claim 1 mounted in a resistor device including a rigid support to which said element is adhered by said adhesive material, first and second electrical terminal means connected to said element at first and second spaced-apart locations thereon, a movable electrical contactor for making contact with said hard surface of said element, and means for locating said contactor in contact with said element in a third location between said first and second locations.

6. In a movable contact type variable-resistance device comprising a support-housing, an elongated electrical resistance element according to claim 1 mounted in said support-housing, an electrically conductive movable contact member mounted in said support-housing for making contact at any desired location on a surface of said resistive element, and means for making electrical connections to the ends of said element.

7. A self-supporting resistance element according to claim 1 in which the temperature coefficient of resistance of said film has a magnitude in the range from substantially zero to 4000 p.p.m./° C.

8. The resistance element of claim 1, wherein the adhesive material is a resin support material.

9. An electrical resistance element capable of being affixed in an electrical resistor device said element being flexible and self-supporting and comprising a thin film between about 0.2 and 3 mils thick of a cured normally hard and rigid thermoset resin bearing electrically conductive particles uniformly dispersed therein, said film being adhered directly to a resin support material characterized by a high order of chemical inertness and temperature stability to at least approximately 300° F. and being conformable to a rigid support base, said film having an exposed surface which is hard and abrasion resistant.

10. The resistance element of claim 9, wherein the resistance is between approximately 30 and 100,000 ohms per square at a nominal thickness of one mil.

11. The resistance element of claim 9, wherein the resin support material is a flexible sheet between about 5 mils and 15 mils thick.

12. The resistance element of claim 9, wherein the temperature coefficient of resistance of said film has a magnitude in the range from substantially zero to 4000 p.p.m./° C.

13. In a movable contact type variable-resistance device comprising a support-housing, an elongated electrically resistive element according to claim 9 mounted in said support-housing, an electrically conductive movable contact member mounted in said support-housing for making contact at any desired location on said hard surface of said resistive element; and means for making electrical connections to the ends of said element.

14. The resistance element of claim 9 in which the output smoothness is not greater than 2%.

15. In a movable contact type variable-resistance device comprising a support-housing, an elongated electrically resistive element according to claim 9 mounted in said support-housing, an electrically conductive movable contact member mounted in said support-housing for making contact at any desired location on said hard surface of said resistive element; and means for making electrical connections to the ends of said element.

16. A resistance element according to claim 9 including at least one electrical contact member for said film sandwiched between said film and said body.

17. A resistance element according to claim 9 in which said body is made of a thermoplastic plastics material.

References Cited

UNITED STATES PATENTS

| | | | |
|---|---|---|---|
| 1,872,581 | 8/1932 | Haroldson | 338—212 |
| 2,679,569 | 5/1954 | Hall | 338—212 |
| 2,705,749 | 4/1955 | Daily et al. | 338—162 |
| 2,714,148 | 7/1955 | Howatt | 338—307 |
| 2,761,849 | 9/1956 | Coler | 252—518 |
| 2,761,854 | 9/1956 | Coler | 260—38 |
| 2,864,774 | 12/1958 | Robinson | 252—514 |
| 2,866,057 | 12/1958 | Peck | 338—308 |
| 3,003,975 | 10/1961 | Louis et al. | 252—503 |
| 3,056,750 | 10/1962 | Pass | 252—511 |
| 3,083,169 | 3/1963 | Ueda et al. | 252—511 |

OTHER REFERENCES

Radio-Electronic Engineering (Radio & Television News), High Temperature Adhesive Tape Resistor, vol. 47, No. 1, January 1952, pp. 338–212.

Dannenberg et al.: Peroxide Crosslinked Carbon Black Polyethylene Compositions, Journal of Polymer Science, vol. XXXI, pp. 127–153, 1958.

ROBERT K. SCHAEFER, Primary Examiner

H. J. HOHAUSER, Assistant Examiner

U.S. Cl. X.R.

252—511; 338—308

UNITED STATES PATENT OFFICE

CERTIFICATE OF CORRECTION

Patent No. 3,457,537 July 22, 1969

Paul J. Hines

It is certified that error appears in the above identified patent and that said Letters Patent are hereby corrected as shown below:

Column 1, line 27, "epoxides" should read -- epoxies --. Column 2, line 24, "FG." should read -- FIG. --. Column 5, line 63, after "invention" insert -- is by way of example only, and not intended to limit the scope of the appended claims. No attempt has been made to illustrate all possible embodiments of the invention --.

Signed and sealed this 19th day of May 1970.

(SEAL)
Attest:

Edward M. Fletcher, Jr.
Attesting Officer

WILLIAM E. SCHUYLER, JR.
Commissioner of Patents